United States Patent [19]
Shearer, Jr.

[11] Patent Number: 6,041,909
[45] Date of Patent: Mar. 28, 2000

[54] CONVEYOR SORTATION SYSTEM WITH PARALLEL DIVERT

[75] Inventor: James T. Shearer, Jr., Ada, Mich.

[73] Assignee: Mannesmann Dematic Rapistan Corp., Grand Rapids, Mich.

[21] Appl. No.: 09/351,634

[22] Filed: Jul. 12, 1999

Related U.S. Application Data

[63] Continuation of application No. 08/943,422, Oct. 3, 1997, Pat. No. 5,927,465.
[60] Provisional application No. 60/028,012, Oct. 8, 1996.
[51] Int. Cl.[7] .............................. B65G 42/10; B65G 42/24
[52] U.S. Cl. .................... 198/370.02; 198/890; 198/412; 198/415
[58] Field of Search ............................... 198/890, 370.02, 198/890.1, 367.1, 723, 364, 717, 412, 415

[56] References Cited

U.S. PATENT DOCUMENTS

| | | |
|---|---|---|
| 2,868,394 | 1/1959 | Greller et al. . |
| 2,984,366 | 5/1961 | Greller ...................................... 214/11 |
| 3,361,247 | 1/1968 | Lauzon et al. ............................. 198/38 |
| 3,384,237 | 5/1968 | Leonard .................................. 209/122 |
| 3,710,923 | 1/1973 | Fromme et al. ........................... 198/81 |
| 3,771,648 | 11/1973 | Revuelta ................................ 209/24 R |
| 4,214,663 | 7/1980 | Schopp et al. .......................... 209/552 |
| 4,487,308 | 12/1984 | Focke et al. ............................ 198/412 |
| 4,501,365 | 2/1985 | Peyton et al. . |
| 4,711,341 | 12/1987 | Yu et al. ................................. 198/372 |
| 4,738,347 | 4/1988 | Brouwer et al. ........................ 198/372 |
| 4,884,677 | 12/1989 | Yu et al. .................................. 198/412 |
| 4,896,760 | 1/1990 | Trantafil et al. ........................ 198/412 |
| 5,038,912 | 8/1991 | Cotter ..................................... 198/370 |
| 5,165,515 | 11/1992 | Nitschke et al. .................... 198/349.95 |
| 5,664,661 | 9/1997 | Maier ..................................... 198/412 |

FOREIGN PATENT DOCUMENTS

| | | |
|---|---|---|
| 0506494 B1 | 8/1996 | European Pat. Off. . |
| 2745298 | 11/1978 | Germany . |
| 55-16933 | 5/1980 | Japan . |
| 1317914 | 12/1989 | Japan . |

Primary Examiner—Christopher P. Ellis
Assistant Examiner—Kenneth W Bower
Attorney, Agent, or Firm—Van Dyke, Gardner, Linn & Burkhart, LLP

[57] ABSTRACT

A conveyor diverting system having an endless conveying surface and diverting shoes transversely movable across the conveying surface for diverting articles having an upstream and a downstream diverting track where the upstream diverting track is oriented parallel to the downstream diverting track for a portion of its length, and converges with the downstream diverting track along its other portion. The conveyor system further includes a controller which utilizes only the downstream diverting track if the article to be diverted is less than a first predetermined length or greater than a second predetermined length. If the article to be diverted is between the first predetermined length and the second predetermined length, then both diverting tracks are utilized.

50 Claims, 11 Drawing Sheets

CONVEYOR SORTATION SYSTEM WITH PARALLEL DIVERT

This application is a continuation of application Ser. No. 08/943,422, filed Oct. 3, 1997, now U.S. Pat. No. 5,927,465, which in turn claims priority to United States Provisional Patent Application, Ser. No. 60/028,012, filed Oct. 8, 1996.

BACKGROUND OF THE INVENTION

This invention relates generally to conveyor diverting systems, and, more particularly, to conveyor diverting systems having an endless conveying surface composed of multiple surface members, each one or group of adjacent ones mounted with a laterally movable shoe capable of diverting articles from the conveyor by pushing laterally against the articles as they move down the conveyor. Such lateral pushing thereby diverts a package, such as from the main conveyor to an adjacent branch conveyor, or other receiving structure.

Article diverters using a moving conveying surface consisting of a plurality of parallel surface members mounted to endless chains have been known for a number of years. Such diverters utilize a diverter shoe movably mounted on each surface member for lateral movement with respect to the conveying surface under the guidance of a track network. The track network is located generally under the conveying surface and guides the diverter shoes via pins which descend from the diverter shoes and engage the track network. Diverting gates in the track network selectively transfer guidance of each diverter shoe from a track running in the direction of the movement of the conveying surface to a diagonal track, or plurality of diagonal tracks, in order to cause lateral movement of the diverter shoes. In order to avoid wasted spacing between variable-length packages, such diverters may include manual or automatic measuring means at an infeed point to cause the diverter gate associated with the selected branch conveyor to divert a selected number of shoes corresponding in general to the length of the package. Exemplary of this type of conveyor are U.S. Pat. No. 3,361,247, issued to James N. Lauzon et al. and U.S. Pat. No. 4,738,347, issued to Brouwer and commonly assigned with the present invention.

With increased demands for the number of packages to be conveyed by such conveying systems, the inter-package spacing distance has become a critical factor in the design of conveying systems. Decreasing the spacing between packages on the conveyor allows a greater throughput of packages by the conveyor. Conversely, providing more space between the packages results in a diminished efficiency and throughput.

Prior diverting systems have addressed the problem of reducing the inter-package spacing requirements. U.S. Pat. No. 5,038,912, issued to David Cotter and commonly assigned with the present application discloses a single diagonal diverting track that is located underneath the conveying surface and is oriented at an angle to the main conveyor and generally points in the direction of the branch conveyor. As packages move down the conveyor, sensors are used to determine the length of the package. When the package reaches the diverting area, a gate is activated which channels the guide pins of the diverting shoes to an alternate path defined by the diagonal diverting track. The diverting gate remains activated to sequentially divert so many diverting shoes as are necessary, based on the measured package length, to successfully push the package off the main conveyor and onto the branch conveyor. After enough diverting shoes have been diverted, the diverting gate is deactivated, and subsequent diverting shoes proceed along one side of the conveyor where they do not divert the adjacent traveling packages.

A specific minimum inter-package spacing is required in this system as a result of the rotation of the diverted package as it is initially diverted. Because of this rotation, additional inter-package spacing is required to avoid conflict between the diverting package and a closely trailing package. This rotation pushes the trailing corner of the package adjacent the branch conveyor back a distance, which can be estimated using the width (W) of the package and the acute angle (θ) which is formed by the intersection of the main conveyor and the branch conveyor. Using these two variables and assuming that the package rotates about the trailing corner opposite the branch conveyors, it will be observed that:

$$A = W \sin \theta$$

where A is the distance the trailing corner adjacent the branch conveyor is pushed back by the package's rotation. It is, therefore, necessary with this system that packages to be diverted are not spaced closer together than the distance $W \sin \theta$.

By way of example, if a diverting branch is oriented at about 20° with packages 16 inches in width, an inter package distance of approximately 5.5 inches is necessary. If the package is 24 inches long, this results in the need for approximately 23% more empty space on the conveyor. A hypothetical system that could divert packages without any significant space between packages could thus produce a 23% increase in package throughput without any increase in conveyor speed. The high desirability of such a system is thus clear.

Another method of diverting packages known, which reduces the required inter-package spacing, is described in commonly assigned U.S. Pat. No. 5,165,515, issued to Michael L. Nitschke et al., which is commonly assigned with the present application. This system increases throughput by not rotating the diverted packages. This non-rotation is accomplished by using a plurality of generally parallel diverting tracks oriented diagonally with respect to the direction of conveyor movement, instead of a single diverting track. Each track has its own diverting gate which is actuated to divert the movement of the diverting shoes from the direction of the conveyor to the lateral diverting direction. By simultaneously activating more than a single diverting gate, a group of diverting shoes corresponding to the measured package length can be moved laterally across the conveyor surface. This group of shoes acts along nearly the entire length of the package to be diverted and, therefore, causes no rotation of the package. Without rotation of the package, the inter-package spacing requirement is reduced to a minimum.

However, this technique is not without difficulties. The deliberate non-rotation of the packages means the packages will enter the branch conveyor still aligned parallel to the main conveyor, but oriented generally diagonally with respect to the branch conveyor (i.e., their lengthwise sides are not parallel to the direction of motion of the branch conveyor). This orientation significantly increases the necessary width of the branch conveyors, resulting in an increase in cost and a reduction in the spacing on branch conveyors. Another difficulty with this method is that it requires an array of diverting gates and associated diverting tracks which must be duplicated for each divert point which adds cost to the diverting system.

It will thus be observed that there exists a need for a conveyor diverting system that can divert packages with little or no inter-package spacing and ensure that packages diverted to the branch conveyor are properly aligned, all while keeping costs to a minimum.

SUMMARY OF THE INVENTION

The present invention provides a sortation conveyor which achieves efficiency gains through reduction of the inter-package spacing. These efficiency gains are especially desirable because they can be achieved without the extra power consumption, noise, and wear that results from increasing the conveyor speed. The present invention increases conveyor diverting system throughput by utilizing a pair of diverting tracks and diverting gates which are structured and controlled in a manner which provides the benefits of an array of diverting tracks with reduced cost and improved performance.

According to one aspect of the invention, the sequence and content of decisions made by an automatic controller overseeing the operation of the diverting gates determine which diverting gates are to be activated and for how long depending upon the measured length of the packages on the conveyor. Sensors positioned along a point upstream of the diverting area provide data which is sent to the controller and interpreted to determine the length of the package. The controller compares the length of the package with a preset distance. Packages having a length less than this preset distance are diverted using one diverting gate. As many diverting shoes as is necessary to divert the package are allowed to be diverted through this single open gate. Packages having a length greater than this preset distance, but less than a second predetermined distance, are diverted using both diverting gates. Only a single diverting shoe is diverted through each gate in this situation. Packages having a length greater than this second predetermined distance are diverted using only a single diverting gate. As many diverting shoes as are necessary to divert the package are allowed to pass through this single open gate. This aspect of the invention achieves many of the benefits of the parallel divert technique disclosed in Nitschke et al. '515 at a much reduced cost and complexity.

According to another aspect of the present invention, a pair of diverting tracks (an upstream and a downstream track) that engage the guide pins of the diverting shoes are constructed so that they extend diagonally across and underneath the conveying surface. At least two pushers diverted to the diverting tracks will initially divert a package parallel to the direction of travel. However, the package will be rotated as it is diverted further toward the branch conveyor. This may be accomplished by the diverting tracks converging in the direction of the branch conveyor. The downstream diverting track may be straight for its entire length, while the upstream track may be straight for only a portion of its length, and curved on the remaining portion. In such embodiment, the straight portion runs generally parallel with the downstream track, while the curved portion begins near the middle of the upstream track and curves in such a manner that it converges with the downstream track. Alternatively, the upstream diverting track may be bent at an angle so that one portion is parallel to the downstream diverting track, and the other portion meets with the downstream diverting track. In yet another embodiment, the upstream diverting track may terminate at or near the middle of the conveying surface.

When a package is to be diverted, a pair of diverting shoes are diverted from the guide track to the diverting tracks, with one traveling along the upstream diverting track and the other traveling along the downstream diverting track. While the upstream diverting shoe is traveling along the straight portion of the upstream diverting track, both diverting shoes are longitudinally aligned with each other and act to push on the package uniformly and non-rotationally. After the upstream diverting shoe passes the transition point, the curved upstream diverting track causes the upstream diverting shoe to no longer act in alignment with the downstream diverting shoe. This results in a rotational force being applied to the package. This rotational force continues to be applied until the package is properly re-oriented for traveling on the branch conveyor.

The straight portion of the upstream diverting track therefore serves to delay the re-orientation of the package until after it has been partially pushed across the conveyor. By delaying the reorientation step, the package causes less interference with trailing packages when it is reoriented. Indeed, the amount of interference is dependent upon two variables other than the inter-package spacing: (1) the length of the delay and (2) the width of the trailing package. The more reorientation is delayed, the less interference there is with trailing packages. When a package is reoriented, it is the upper trailing corner of the package that swings into the trailing package. With a trailing package of smaller width, the re-orientation delay can permit the package to be pushed into a new position prior to reorientation that does not interfere with the trailing package when reoriented.

These and other objects, advantages, and features of this invention will become apparent upon review of the following specification in conjunction with the drawings.

DESCRIPTION OF THE PREFERRED EMBODIMENT

Figure 1:
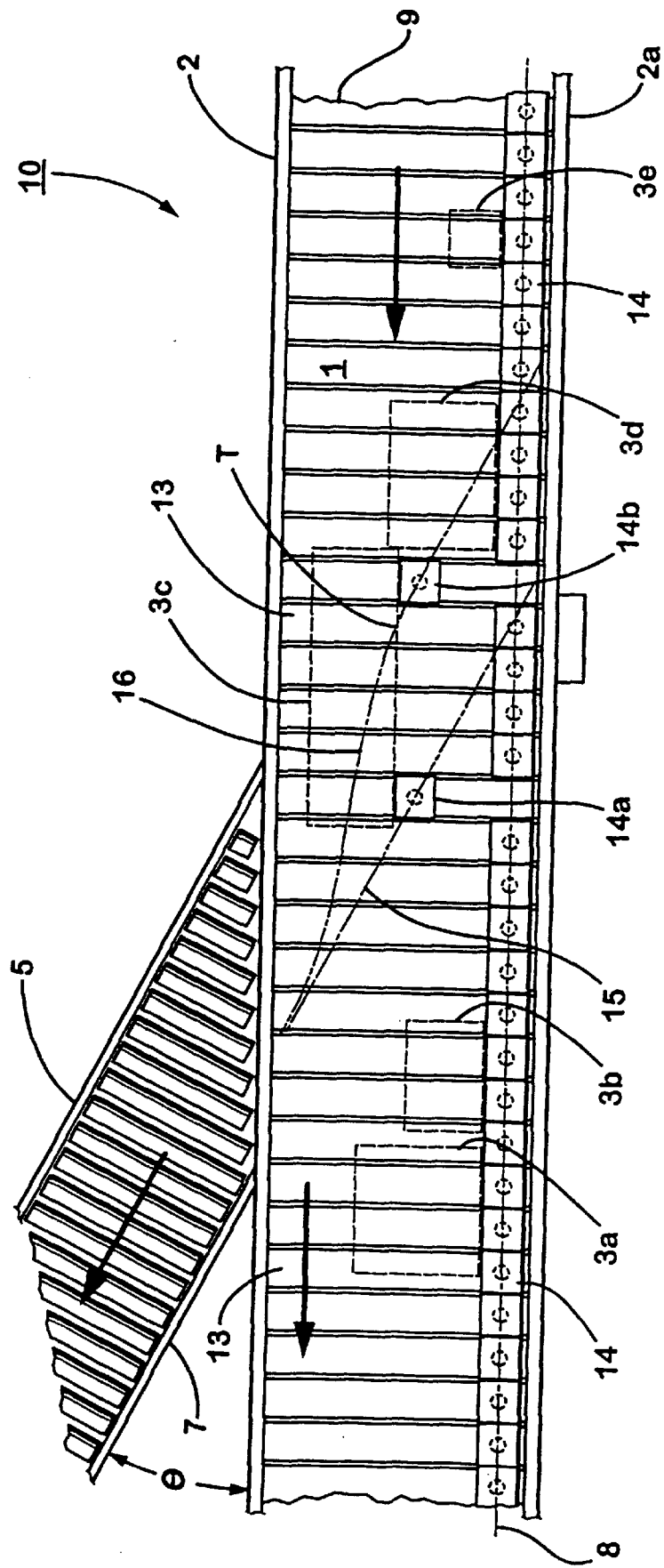
FIG. 1 is a top plan view of a conveying system according to the invention.

Referring specifically to drawings and the illustrative embodiments therein, a conveying system 10 includes a main conveyor 9 and a branch conveyor 5 (FIG. 1). The branch conveyor 5 is positioned adjacent to the main conveyor 9 and at an angle. The arrows illustrate the direction of conveyance for both the main conveyor 9 and the branch conveyor 5.

A conveying surface 1 of main conveyor 9 is defined by a series of surface members 13. The lengthwise direction of the surface members 13 is oriented perpendicular to the direction of movement of the main conveyor 9. Surface members 13 are supported on either side by supporting side rails 2 and 2a. The details of the interconnections of the surface members with each other are disclosed in U.S. Pat. No. 5,127,510, issued to David H. Cotter et al., the disclosure of which is hereby incorporated herein by reference and will not be repeated.

A series of diverting shoes 14 are located along the side of the main conveyor 9 opposite to branch conveyor 5. When the diverting shoes 14 are not being utilized to push an article off the main conveyor onto a branch conveyor, they travel in sequence along the shoe guideway 8 adjacent the longitudinally extending guide track 12b. This guide track 12b prevents the diverting shoes 14 from moving transversely across the conveyor except at the point along the conveyor at which diverting gates 25a–25b are located, or along other similar points where a branch conveyor connects to the main conveyor. Means for returning diverting shoes 14a and 14b to this side of the conveyor are not shown and are not considered part of this invention. Diverting shoe 14b follows the upstream diverting path 16. Diverting shoe 14a follows the downstream diverting path 15.

Figure 2:
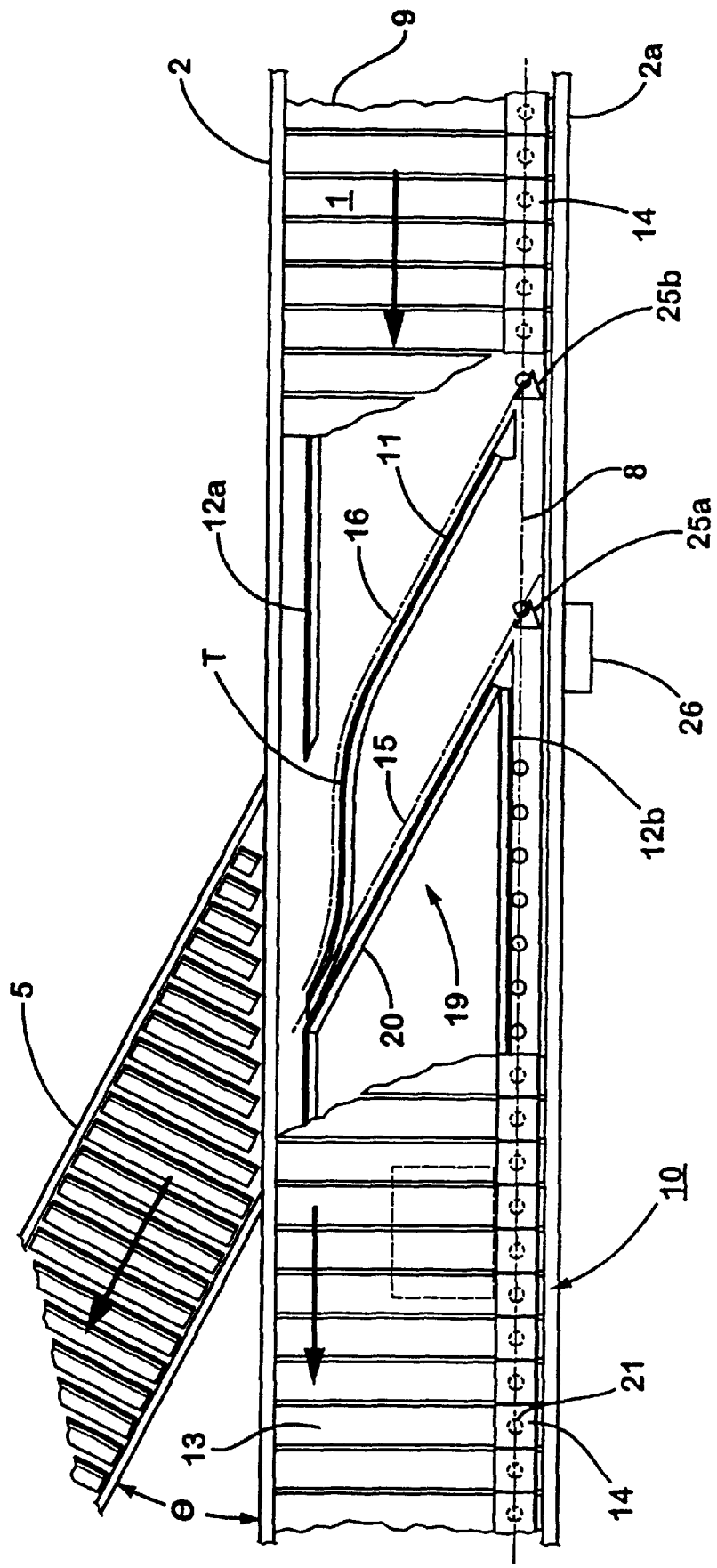
FIG. 2 is a top plan view of the conveying system of FIG. 1 with a center portion removed to illustrate the underlying structure.

A section of the conveying surface 1 has been removed from the center portion of FIG. 2 to illustrate the underlying structure. Diverting gates 25a and 25b can be seen attached along one side of the main conveyor 10 and in the path of diverting shoes 14. Diverting gates 25a and 25b are preferably of the type disclosed in U.S. Pat. No. 5,038,912, the disclosure of which is hereby incorporated herein by reference. Upstream diverting track 11 is parallel with downstream diverting track 20 for a first portion of its length. A second portion of its length curves into and meets downstream diverting track path 15. When diverting gate 25b is activated into a diverting position, diverting shoes are diverted along the curved upstream diverting track 11. When diverting gate 25b is not activated into a diverting position, but, instead, remains in a non-diverting position, the diverting shoes continue to move along the side of the main conveyor until they reach diverting gate 25a. Upon reaching this point, the diverting shoes are either diverted to follow along downstream diverting track 20, or continue to move along the side of the main conveyor 9 in a non-diverting state depending upon whether diverting gate 25a is activated or not.

FIG. 1 illustrates five packages 3a–3e of varying size and shape positioned on main conveyor 9. Package 3c is shown being diverted by diverting shoes 14a and 14b. Diverting shoes 14a and 14b simultaneously contact package 3c generally near either of its ends so that package 3c does not experience any rotational force when initially contacted by shoes 14a and 14b. Package 3d is thus able to follow package 3c with very little separating space. As diverting shoe 14b travels along the upstream diverting track path 16, it moves in a path generally parallel to downstream diverting track path 15. However, when diverting shoe 14b reaches the curved portion of upstream diverting track 11, it begins to follow a curved path merging toward downstream diverting track path 15. As will be discussed further below, the package begins to experience a rotational force after diverting shoe 14b engages the curved portion of upstream diverting track 11.

Figure 3:
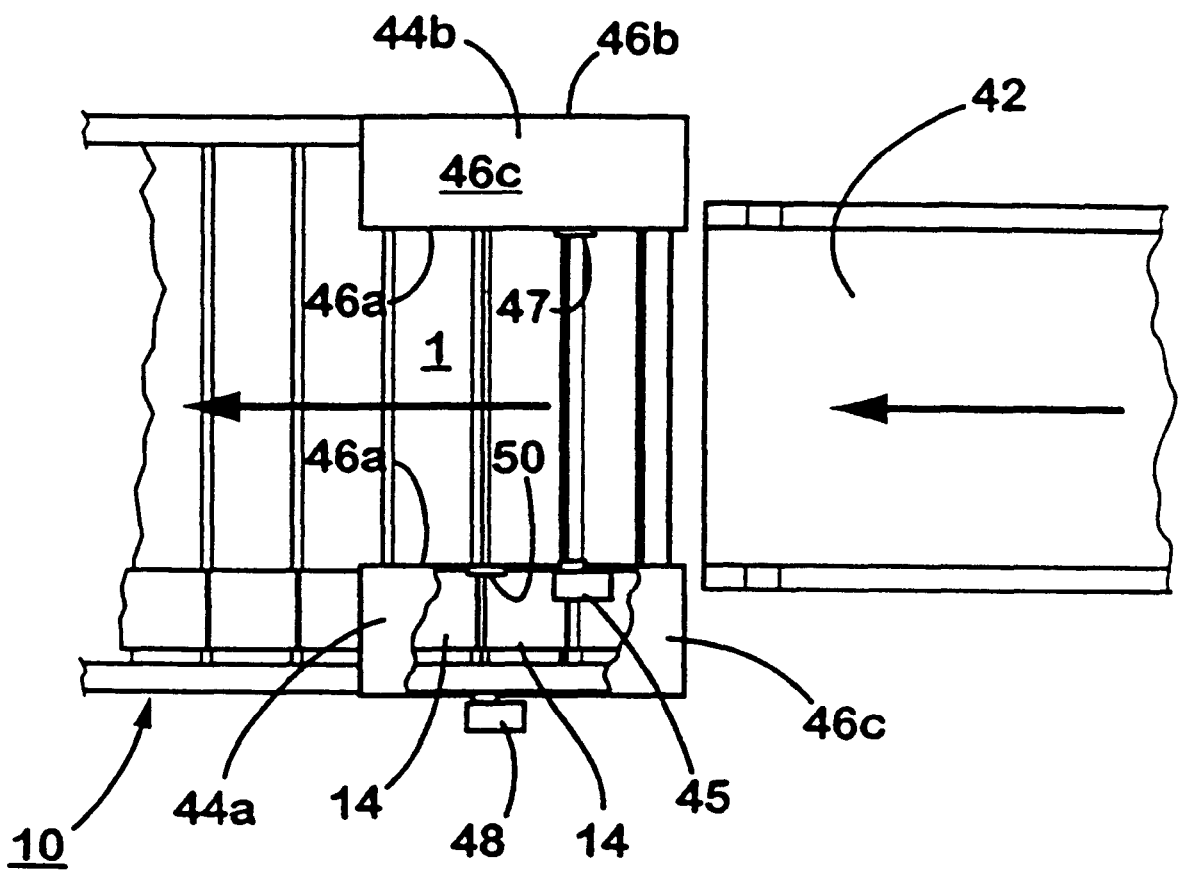
FIG. 3 is a top view of the feed conveyor and the main conveyor.

Conveyor system 10 has a control system 43 which can take a variety of difference forms but which preferably includes substantially the same hardware configuration as disclosed in U.S. Pat. No. 5,165,515 issued to Nitschke et al., the disclosure of which is hereby incorporated herein by reference (FIGS. 3–5) and will not be repeated herein. Suffice it to say, packages are supplied to conveying surface 1 from a slider-bed infeed conveyor 42. Conveying system 10 includes a pair of mounting brackets 44a and 44b adjacent infeed conveyor 42. Each bracket 44a and 44b includes an inner vertical wall 46a and an outer vertical wall 46b which are spanned by a horizontal upper wall 46c. A portion of wall 46c of mounting bracket 44a is removed to reveal structure mounted internally to that mounting bracket. This includes a shoe detector photosensor 48 mounted to wall 46b and a corresponding reflector 50 mounted to the interior of wall 46a of mounting bracket 44a. Additionally, a package detector update photosensor 45 is mounted to wall 46a of bracket 44a and a corresponding reflector 47 is mounted to wall 46a of bracket 44b. With this arrangement, a photobeam generated by photosensor 48 and reflected by reflector 50 is in the path of diverter shoes 14 as conveying surface 1 progressively moves. However, packages on conveying surface 1 do not affect photosensor 48. Another photobeam is generated by update photosensor 45 and reflected by reflector 47. Packages deposited on conveying surface 1 from infeed conveyor 42 interrupt this beam, but it is not affected by the movement of diverter shoes 14.

Figure 4:
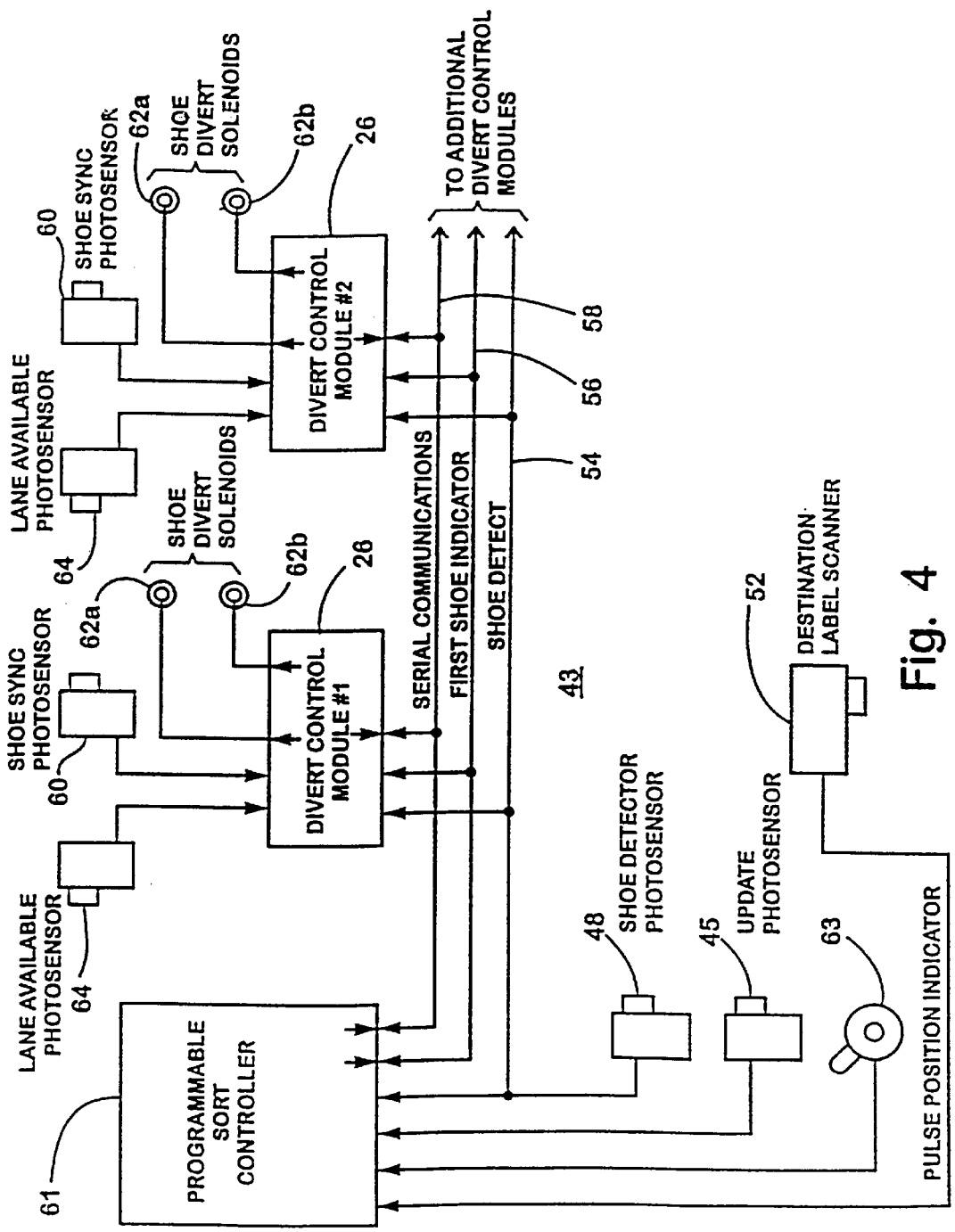
FIG. 4 is a block diagram of the control system.

Photosensors 45 and 48 supply input signals to a central programmable sort controller 61, which can be seen in FIG. 4. Sort controller 61 also receives an input from a pulse position indicator (PPI) 63 that is responsive to the movement of conveying surface 1. PPI 63 provides output pulses that are a function of the incremented movement of the conveying surface 1. Through the use of these three inputs, controller 61 is able to monitor the length, the position, and the movement of the packages. Sort controller 61 also may receive inputs from a destination label scanner 52, which typically will be positioned above infeed conveyor 42 to read and decode standard product bar codes (not shown) printed on the side or top of packages 3. Sort controller 61 is electrically interconnected with each divert control module 26 located alongside main conveyor 9 for each branch conveyor 5. This interconnection includes a shoe detect line 54, a first-shoe indicator line 56, and a two-way serial communication line 58. Lines 54, 56, and 58 are common to all divert control modules 26. In this manner, electrical interconnections along conveying system 10, which may be many tens-of feet long, are greatly simplified.

Each diverter control module 26 receives an input from a shoe-synchronizing photosensor 60. In contrast to the shoe detector photosensor 48 which monitors the leading and trailing edge of each shoe, shoe-sync photosensor 60 responds to the leading edge of the guide pine 21 of the shoe in order to provide precision actuation of the corresponding diverting gates 25a and 25b. Each diverter control module 26 provides outputs to the shoe divert solenoids 62a and 62b, which correspond and operate to diverting gates 25a and 25b. Each diverter control module 26 receives an input from a lane-available photodetector 64 which is a sensing device located along the branch conveyor 5 to provide an indication of whether the branch conveyor has fully accumulated with packages.

In operation, programmable sort controller 61 monitors shoe detector photosensor 48, update photosensor 45, and PPI 63. Each shoe is assigned a unique shoe ID number, which is encoded in system 10 during a calibration mode by a pulsing of the first shoe indicator line 56 once for each passage of the total number of shoes. Once synchronized, the sort controller 61 matches shoes, by ID number, with a package entering system 10, and establishes a data file for the package including its measured length, the first shoe associated with that package and a package identifier to identify the destination branch conveyor to which it is to be sorted. The destination branch conveyor could be manually entered into the system. In a preferred embodiment, however, sort controller 61 is programmed to select the destination branch conveyor in response to the product code on the package read by destination label scanner 52. As each package travels along conveying surface 1 between infeed conveyor 42 and branch conveyors 5, they arrive at a pre-established divert activation point. At this point, the programmable sort controller 61 makes a determination of which shoes, by their unique ID number, will be diverted with the package, or that the package cannot be diverted because the lane-available photo-detector has sensed a back-up in the branch conveyor. In the latter case, no packages will be diverted until the branch conveyor is sensed to have sufficient space available for additional packages.

Figure 5:
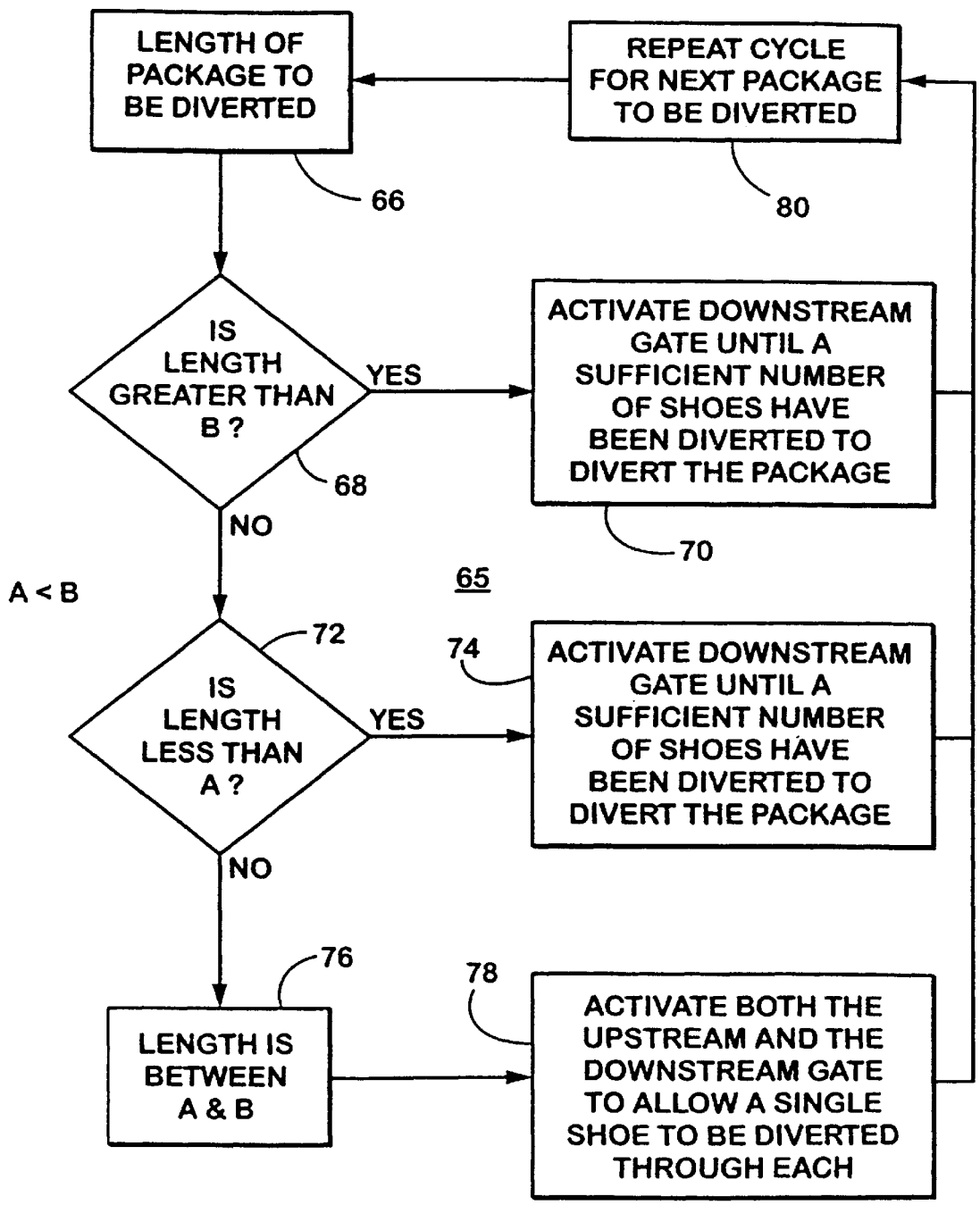
FIG. 5 is a flow chart of a program for controlling a conveyor system according to the invention.

Programmable sort controller 61 includes a control program 65 which uses the input of update photosensor 45 to determine the length of the package at 66. Program 65 compares the length of the package to two predetermined lengths and generates different control outputs accordingly (FIG. 5). If it is determined at 68 that the length of the package to be diverted is greater than a pre-programmed length B, programmable sort controller 61 sends a packet of data over serial communication line 58 to divert control module 26 instructing it to activate downstream diverting gate 25b at 70. It further instructs divert control module 26 to deactivate downstream diverting gate 25b after a sufficient number of diverting shoes have been diverted. If it is determined at 68 that the length of the package to be diverted is less than B, it is then determined at 72 whether the measured packaged length is less than A. Length A is less than length B and approximately equal to the separation distance between diverting gates 25a and 25b. If the package length is determined at 72 to be less than A, then the programmable sort controller 61 sends a packet of data over communication line 58 to divert control module 26 instructing it to activate downstream diverting gate 25b at 74. It further instructs divert control module 26 to deactivate downstream diverting gate 25b after a sufficient number of diverting shoes have been diverted. If it is determined at 72 that the package is greater than A, then it is concluded at 76 that the package length is between A and B. Programmable sort controller 61 then sends a packet of data over serial communication line 58 to divert control module 26 instructing it to activate both the upstream and downstream diverting gates 25a, 25b at 78. The data packet further instructs divert control module 26 to deactivate diverting gates 25a and 25b after a single diverting shoe has passed through each. At 80, program 65 repeats this process for the next package to be diverted.

Figure 6A:
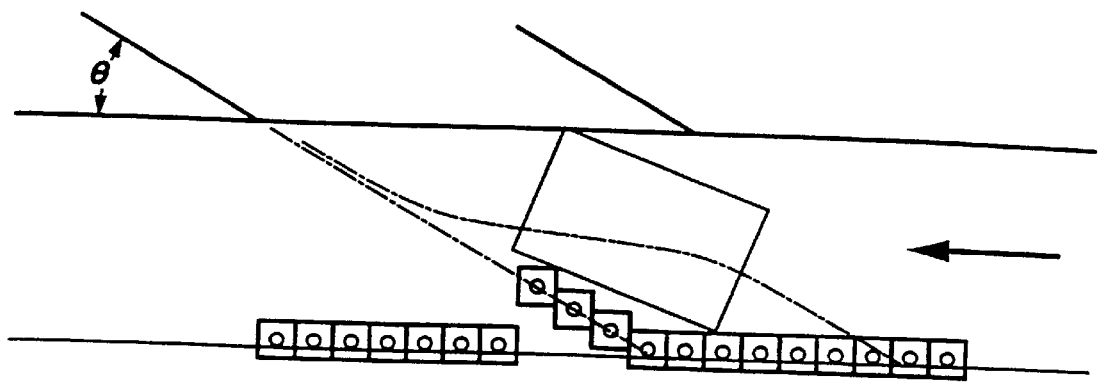
FIGS. 6(a)–(c) are plan view diagrams illustrating the operation of a conveyor according to the invention.
Figure 6B:
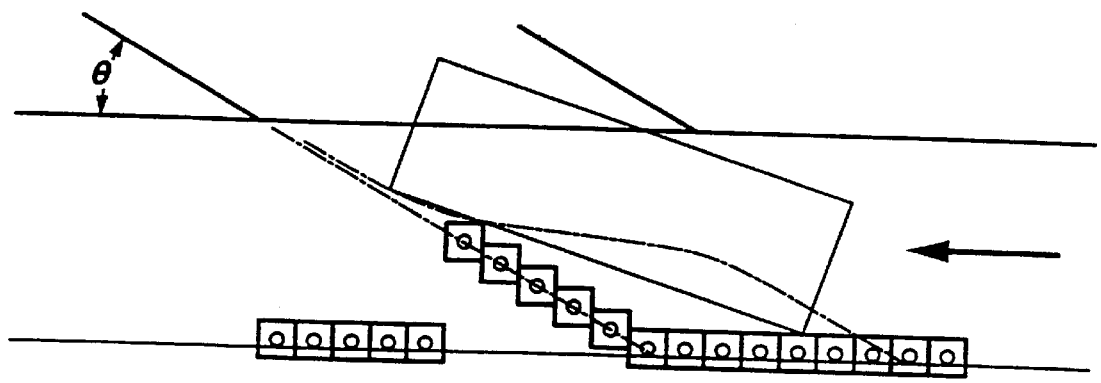
Figure 6C:
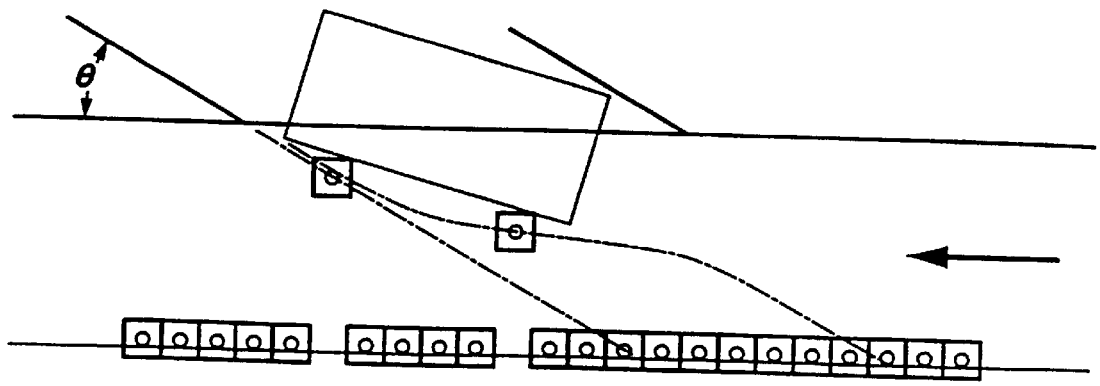

FIGS. 6a–6c illustrate various package sizes being diverted. In FIG. 6a, a package of length less than pre-programmed length A is being diverted. Only the downstream diverting gate 25a is activated and as many diverting shoes as is necessary to divert the package are being diverted. This diverting corresponds with step 74 in FIG. 5. In FIG. 6b, a package of greater length than pre-programmed length B is being diverted. Similarly, only downstream diverting gate 25a is activated and as many diverting shoes as is necessary to divert the package are being diverted. This diverting corresponds with step 70 in FIG. 5. In FIG. 6c, a package of length between pre-programmed lengths A and B is being diverted. Only a single diverting shoe has been diverted along each diverting track. This diverting corresponds with step 78 in FIG. 5.

Figure 7:
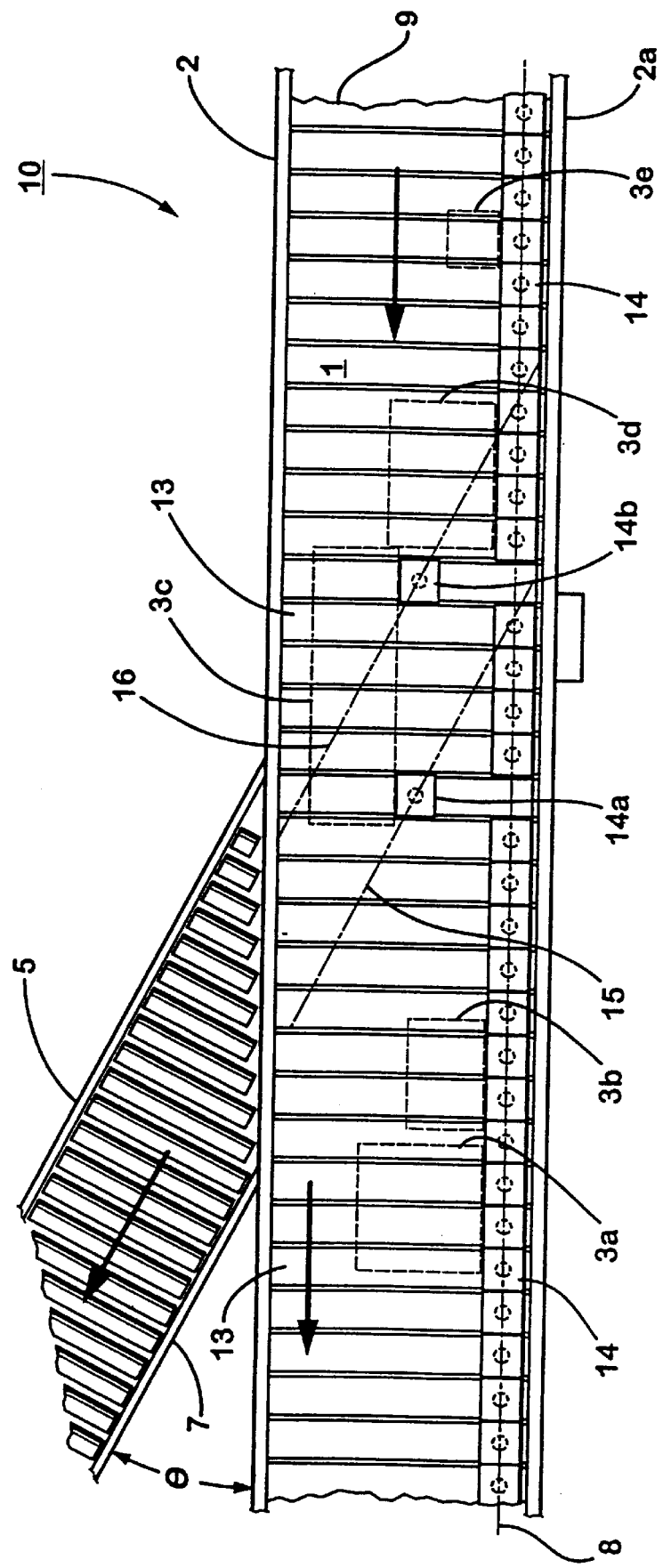
FIG. 7 is a top plan view of an alternate embodiment of the invention.
Figure 8:
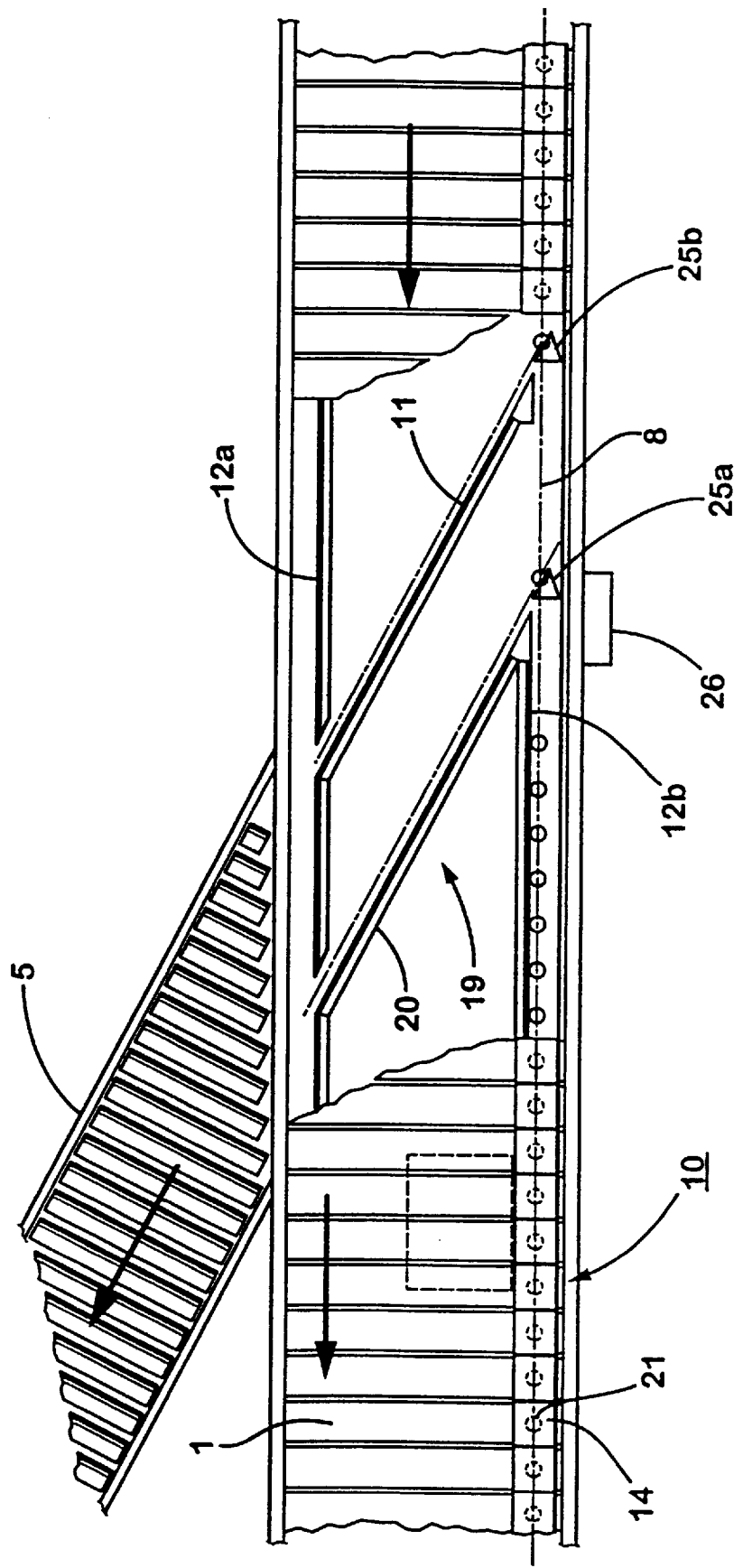
FIG. 8 is a top plan view of the conveying system of FIG. 7 with a center portion removed to illustrate the underlying structure.

FIGS. 7 and 8 illustrate an alternative embodiment of the present invention using the above-described control logic. This alternate embodiment does not involve an upstream diverting track converging with a downstream diverting track, as is present in other embodiments of the invention. Because the diverting tracks are parallel fully across the converging surface, mid-length packages, which are diverted with one shoe on each track, will not be rotated prior to being discharged to the branch conveyor. In FIG. 7, a package 3c of length between pre-programmed lengths A and B is shown being diverted. Only diverting shoes 14a and 14b have been diverted.

Figure 9:
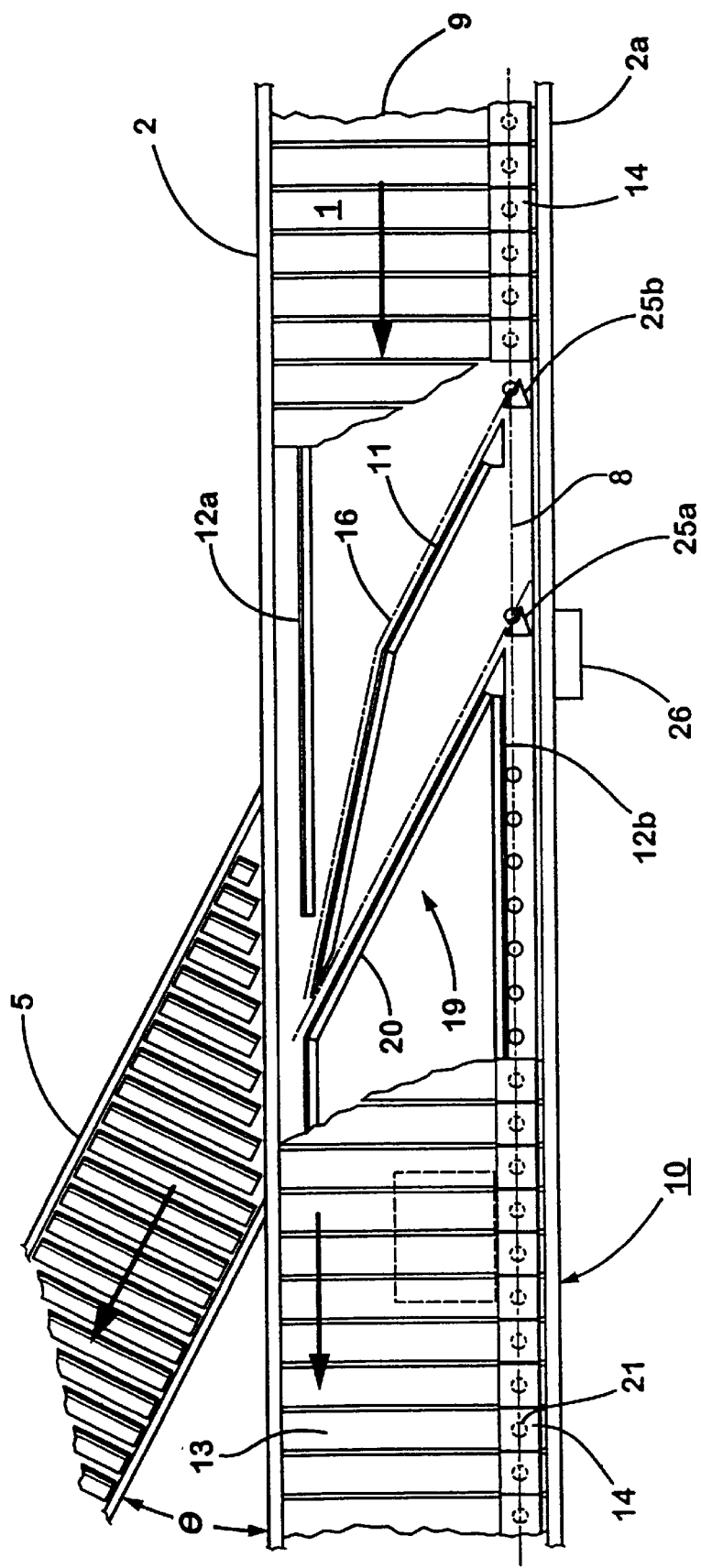
FIG. 9 is a top plan view of an alternate embodiment of the invention with a center portion removed to illustrate the bent upstream diverting track.
Figure 10:
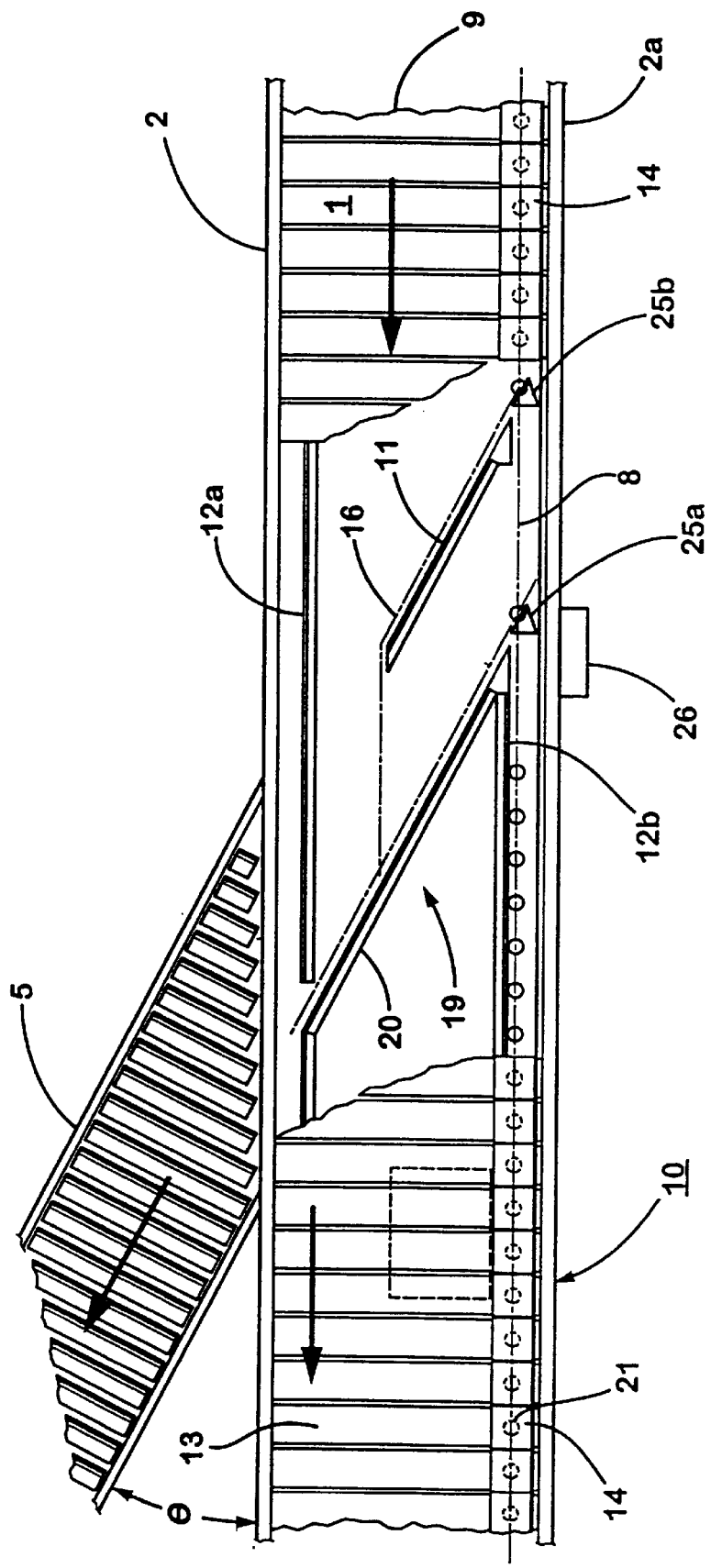
FIG. 10 is a top plan view of an alternate embodiment of the invention with a center portion removed to illustrate the terminated upstream diverting track.

Another alternative embodiment of the present invention is shown in FIGS. 9 and 10, where a middle portion of the conveyor has, again, been removed to show the underlying structure. In FIG. 9, upstream diverting track 11 is bent at an angle instead of being curved as in other embodiments. The bent portion meets with downstream diverting track 20. The use of a bent upstream diverting track is simpler to manufacture than a curved track, while it still causes rotation of the package being diverted, after a delay. Indeed, the bent upstream diverting track can be made of two straight pieces of track appropriately fastened together. In FIG. 10, upstream diverting track 11 terminates near the middle of the conveyor 9. This embodiment also creates a rotation of the package to be diverted, after a delay. In both of these embodiments, the delay is equal to the time it takes for upstream diverting shoe 14b to travel the length of the portion of upstream diverting track 11 that is generally parallel to downstream diverting track 20.

Figure 11:
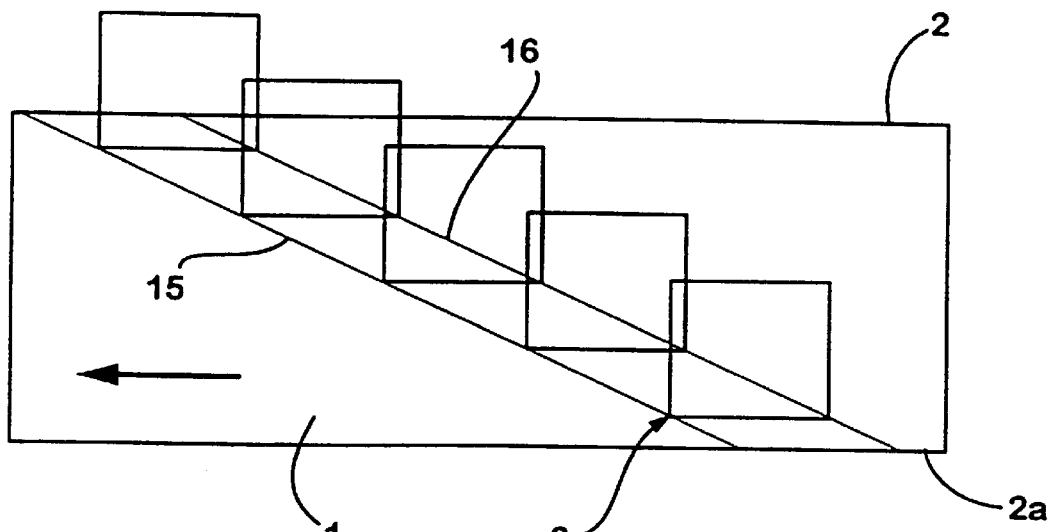
FIG. 11 is a diagram of the embodiment of the invention shown in FIGS. 7 and 8 illustrating a single package in various stages of divert.
Figure 12:
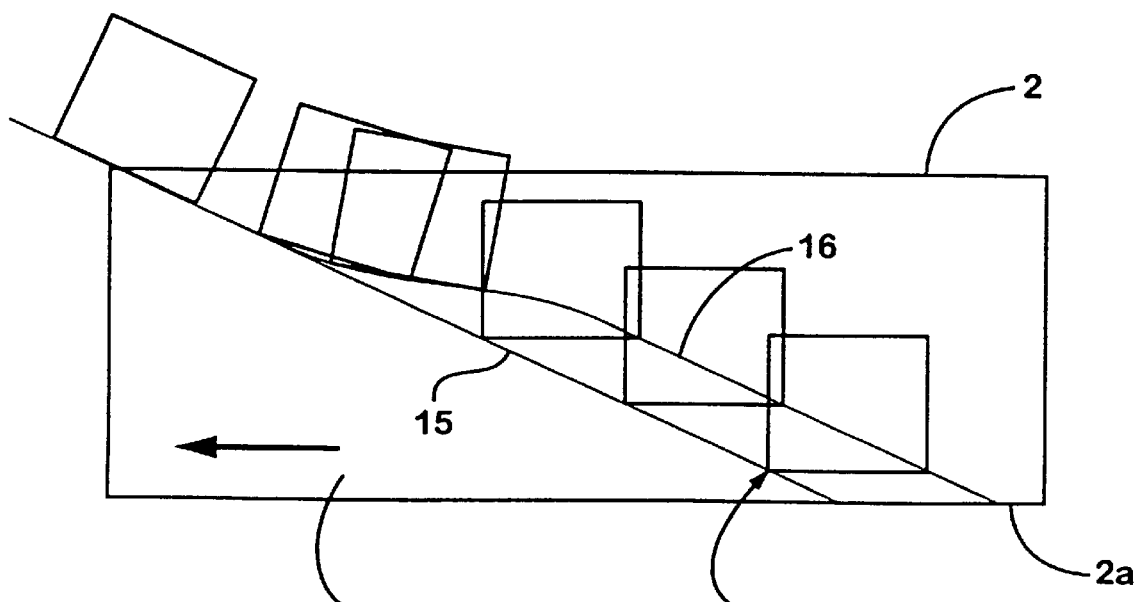
FIG. 12 is a diagram of the embodiment of the invention shown in FIGS. 1 and 2 illustrating a single package in various stages of divert.

FIG. 11 illustrates a single package 3 in various stages of being diverted according to one embodiment of the invention. In this embodiment, the package remains oriented generally parallel to the direction of motion of the main conveyor. FIG. 12 illustrates a single package 3 in another embodiment of the invention. In this embodiment, the package 3 remains oriented generally parallel to the direction of motion of the main conveyor, but is rotated after being partially diverted.

Having described the invention in connection with certain specific embodiments thereof, it is to be understood that the description is meant to be interpreted as illustrative only, and that various modifications may also be made by those skilled in the art without departing from the spirit and scope of the invention as expressed in the accompanying claims.

The embodiment of the invention in which an exclusive property or privilege is claimed are defined as follows:

1. A method of diverting articles comprising:

providing a conveyor comprising a plurality of conveying members connected in a web, the upper surfaces of the conveying members define a conveying surface, and movable pushers associated with at least some of the conveying members which are selectively moveable across said conveying surface to divert articles carried on said conveying surface;

diverting particular ones of articles on the conveying surface without substantially altering the angular orientation of said particular ones of the articles at least during an initial portion of said diverting; and diverting particular others of said articles on the conveying surface including altering the angular orientation of said particular others of said articles at least during an initial portion of said diverting.

2. The method of claim 1 including providing a plurality of diverts for diverting said moveable pushers wherein said diverting of said particular others of said articles includes altering the orientation of the articles by activating only a single one of said diverts.

3. The method of claim 1 including providing a plurality of diverts for diverting said moveable pushers wherein said diverting of articles without substantially altering their orientation for at least an initial portion of said diverting comprises activating at least two of said diverts.

4. The method of claim 1 including diverting said particular ones of the articles without substantially altering the orientation of said particular one of the articles throughout substantially the entire diverting.

5. The method of claim 1 wherein said altering the orientation of said particular others of said articles comprises rotation of said particular others of said articles about a vertical axis.

6. The method of claim 1 further including measuring an article related distance for said articles, comparing the article related distance to a predetermined distance, and designating articles as either said particular ones of said articles or as said particular others of said articles as a result of said measuring of said article related distance.

7. The method of claim 6 further including diverting the particular ones of the articles only if the article related distance is less than the predetermined distance.

8. The method of claim 6 wherein the article related distance is a length of the articles.

9. The method of claim 1 wherein said articles are substantially aligned on said main conveyor with each other prior to diverting, said initial portion of said diverting of particular ones of said articles is sufficient to displace said particular ones of said articles out of alignment with other articles on said main conveyor, and said particular ones of said articles are reoriented after said initial portion of said diverting.

10. The method of claim 9 wherein said conveying members further include a lower portion and two other portions between said upper and lower portions.

11. The method of claim 1 wherein each of said conveying members include an outer surface having a planar upper portion defining said conveying surface.

12. The method of claim 11 wherein each of said moveable pushers include a support portion having a glide surface engaging said upper, lower, and two other portions to guide along.

13. A method of diverting articles comprising:
providing a conveyor comprising a plurality of conveying members connected in a web, the upper surfaces of the conveying members define a conveying surface:
providing movable pushers associated with at least some of the conveying members the pushers are selectively moveable across said conveying surface to divert articles carried on said conveying surface;
providing a plurality of diverts which selectively cause said pushers to move across said conveying members when said diverts are activated to a diverting state;
measuring the length of the article to be diverted;
activating at least two of said plurality of diverts when the length of said article is less than a predetermined length; and
activating only one of said plurality of diverts when the length of said article is greater than said predetermined length.

14. The method of claim 13 wherein said activating at least two of said plurality of diverts comprises activating said diverts long enough to allow only a single pusher to be diverted.

15. The method of claim 13 further including activating only one of said plurality of diverts when the length of said article is less than said predetermined length.

16. The method of claim 15 wherein said activating only one of said plurality of diverts comprises activating said divert long enough to allow at least two of said pushers to be diverted.

17. The method of claim 13 wherein said activating at least two of said plurality of diverts further comprises maintaining an orientation of the article being diverted for at least an initial portion of the diverting.

18. The method of claim 17 including altering the orientation of the article being diverted after said initial portion of the diverting.

19. The method of claim 13 wherein each of said conveying members include an outer surface having a planar upper portion defining said conveying surface.

20. The method of claim 14 wherein said conveying members further include a lower portion and two other portions between said upper and lower portions.

21. The method of claim 17 wherein each of said moveable pushers include a support portion having a glide surface engaging said upper, lower, and two other portions to guide along.

22. A conveyor diverting system, comprising:
a conveyor having a plurality of conveying members connected in a web, the upper surfaces of the conveying members define a conveying surface;
a plurality of pushers associated with at least some of the conveying members the pushers are selectively movable across said conveying surface to divert articles carried on said conveying surface;
a plurality of diverts which cause said pushers to move across said first conveyor when said diverts are activated to a diverting state; and
a control system that measures an article related distance and activates at least two of said plurality of diverts when the article related distance is less than a predetermined length, and activates only a single one of said plurality of diverts when the length of the article is greater than the predetermined length.

23. The conveyor diverting system of claim 17 wherein said control system activates only one of said diverts when the length of the article is less than another predetermined length, said another predetermined length less than said predetermined length.

24. The conveyor diverting system of claim 22 wherein said article related distance is the length of the article.

25. The conveyor diverting system of claim 24 wherein when only a single one of said diverts is activated, said control system activates said divert long enough to allow at least two of said pushers to be diverted.

26. The conveyor diverting system of claim 24 wherein when at least two of said plurality of diverts are activated, said control system activates said diverts long enough to allow only a single pusher to be diverted by each divert.

27. The conveyor diverting system of claim 24 wherein said conveying members include an outer surface having a planar upper portion defining said conveying surface.

28. The method of claim 27 wherein said conveying members further include a lower portion and two other portions between said upper and lower portions.

29. The method of claim 28 wherein each of said moveable pushers include a support portion having a glide surface engaging said upper, lower, and two other portions to guide along.

30. A method of diverting articles comprising:

providing a conveyor comprising a plurality of conveying members connected in a web, the upper surfaces of which define a conveying surface, and movable pushers associated with at least some of the conveying members which are selectively moveable across said conveying surface to divert articles carried on said conveying surface;

diverting particular ones of the articles on the conveying surface without substantially altering the orientation of said particular ones of the articles; and diverting particular others of said articles including altering the orientation of said particular others of said articles during said diverting.

31. The method of claim 30 including providing a plurality of diverts for diverting said moveable pushers wherein said altering the orientation of said particular ones of the articles comprises activating only a single one of said diverts.

32. The method of claim 30 including providing a plurality of diverts for diverting said moveable pushers wherein said diverting of articles without substantially altering their orientation comprises activating at least two of said diverts.

33. The method of claim 30 wherein said altering the orientation of said particular ones of said articles comprises rotation of said articles about a vertical axis.

34. The method of claim 30 further including measuring an article related distance for said articles, comparing the article related distance to a predetermined length, and designating said articles as either said particular ones of said articles or as said particular others of said articles as a result of said measuring of said article related distance.

35. The method of claim 34 wherein the article related distance is a length of the articles.

36. The method of claim 35 wherein each of said conveying members include an outer surface having a planar upper portion defining said conveying surface.

37. The method of claim 36 wherein said conveying members further include a lower portion and two other portions between said upper and lower portions.

38. The method of claim 36 wherein each of said moveable pushers include a support portion having a glide surface engaging said upper, lower, and two other portions to guide along.

39. A conveyor diverting system, comprising:

a conveyor having a plurality of conveying members connected in a web, the upper surfaces of the conveying members define a conveying surface, and movable pushers associated with at least some of the conveying members the pushers are selectively moveable across said conveying surface to divert articles carried on said conveying surface;

a control system that diverts particular ones of articles on the conveying surface without substantially altering the angular orientation of said particular ones of the articles at least during an initial portion of said diverting, and that diverts particular others of said articles on the angular conveying surface by altering the orientation of said particular others of said articles at least during an initial portion of said diverting.

40. The conveyor diverting system of claim 39 further including a plurality of diverts for diverting said moveable pushers wherein said control system alters the orientation of the particular others of said articles by activating only a single one of said diverts.

41. The conveyor diverting system of claim 39 further including a plurality of diverts for diverting said moveable pushers wherein said control system diverts said particular ones of the articles by activating at least two of said diverts.

42. The conveyor diverting system of claim 39 wherein the control system diverts the particular ones of the articles without substantially altering their orientation throughout the entire diverting.

43. The conveyor diverting system of claim 39 wherein said control system alters the orientation of said particular ones of said articles by rotating said articles about a vertical axis.

44. The conveyor diverting system of claim 39 wherein said articles are substantially aligned on said main conveyor with each other prior to diverting, said initial portion of said diverting of particular ones of said articles is sufficient to displace said particular ones of said articles out of alignment with other articles on said main conveyor, and said particular ones of said articles are reoriented after said initial portion of said diverting.

45. The conveyor diverting system of claim 39 wherein said control system measures an article related distance for said articles, compares the article related distance to a predetermined distance, and designates said articles as either said particular ones of said articles or as said particular others of said articles as a result of measuring of said article related distance.

46. The conveyor diverting system of claim 45 wherein said control system diverts the particular ones of the articles only if the article related distance is less than the predetermined distance.

47. The conveyor diverting system of claim 45 wherein the article related distance is a length of the articles.

48. The conveyor diverting system of claim 39 wherein each of said conveying members include an outer surface having a planar upper portion defining said conveying surface.

49. The conveyor diverting system of claim 48 wherein said conveying members further include a lower portion and two other portions between said upper and lower portions.

50. The conveyor diverting system of claim 49 wherein each of said moveable pushers include a support portion having a glide surface engaging said upper, lower, and two other portions to guide along.

* * * * *

UNITED STATES PATENT AND TRADEMARK OFFICE
CERTIFICATE OF CORRECTION

PATENT NO. : 6,041,909
DATED : March 28, 2000
INVENTOR(S) : James T. Shearer, Jr.

It is certified that error appears in the above-identified patent and that said Letters Patent is hereby corrected as shown below:

Column 2,
Line 18, "comer" should be -- corner --

Column 12,
Line 3, "angular" should be deleted before -- conveying --
Line 3, insert -- angular -- before "orientation"

Signed and Sealed this

Twelfth Day of November, 2002

*Attest:*

*Attesting Officer*

JAMES E. ROGAN
*Director of the United States Patent and Trademark Office*